United States Patent
Mank

(10) Patent No.: US 9,736,530 B2
(45) Date of Patent: Aug. 15, 2017

(54) ADDRESS MAPPING IN A HDMI NETWORK

(71) Applicant: SONY CORPORATION, Minato-ku (JP)

(72) Inventor: Armin Mank, Waiblingen (DE)

(73) Assignee: SONY CORPORATION, Tokyo (JP)

( * ) Notice: Subject to any disclaimer, the term of this patent is extended or adjusted under 35 U.S.C. 154(b) by 46 days.

(21) Appl. No.: 14/345,539

(22) PCT Filed: Sep. 26, 2012

(86) PCT No.: PCT/EP2012/068910
§ 371 (c)(1),
(2) Date: Mar. 18, 2014

(87) PCT Pub. No.: WO2013/045467
PCT Pub. Date: Apr. 4, 2013

(65) Prior Publication Data
US 2014/0359675 A1 Dec. 4, 2014

(30) Foreign Application Priority Data
Sep. 28, 2011 (EP) .................................... 11183106

(51) Int. Cl.
*H04H 60/33* (2008.01)
*H04N 21/4363* (2011.01)
(Continued)

(52) U.S. Cl.
CPC ... *H04N 21/43635* (2013.01); *H04L 12/2805* (2013.01); *H04L 12/2809* (2013.01);
(Continued)

(58) Field of Classification Search
CPC ................................................ H04N 21/44227
See application file for complete search history.

(56) References Cited

U.S. PATENT DOCUMENTS

| 6,182,094 B1 * | 1/2001 | Humpleman | ....... H04L 12/2805 |
| | | | 348/E5.006 |
| 6,363,434 B1 * | 3/2002 | Eytchison | ............... H04L 12/24 |
| | | | 375/E7.019 |

(Continued)

FOREIGN PATENT DOCUMENTS

| CN | 1267421 A | 9/2000 |
| CN | 151841 A | 7/2004 |

(Continued)

OTHER PUBLICATIONS

Written Opinion of the International Searching Authority Issued Nov. 23, 2012 in PCT/EP12/068910 filed Sep. 26, 2012.

(Continued)

*Primary Examiner* — Pankaj Kumar
*Assistant Examiner* — Timothy Newlin
(74) *Attorney, Agent, or Firm* — Oblon, McClelland, Maier & Neustadt, L.L.P.

(57) ABSTRACT

A network device for a home entertainment network including a network controller configured to provide Ethernet communication capability, HEC, and CEC, consumer electronics control, communication capability, and a database generator unit configured to generate a database containing information about a network device of the home entertainment network, and a unique identifier of the respective network device.

31 Claims, 5 Drawing Sheets

Device Datatable
2011-02-10:

| Date & time | Logical Address | Physical Address | Network ID | MAC Address |
|---|---|---|---|---|
| 10.2.2011 17:00 | 0 (TV 120) | 0.0.0.0 | A | 01-01-01-01-01-aa |
| 10.2.2011 17:00 | 4 (Playback Device 121) | 1.0.0.0 | A | 01-01-01-01-01-bb |
| 10.2.2011 17:00 | 8 (Playback Device 122) | 2.0.0.0 | A | 01-01-01-01-01-cc |
| 10.2.2011 20:00 | 0 (TV 140) | 0.0.0.0 | B | 01-01-01-01-01-dd |
| 10.2.2011 20:00 | 4 (Playback Device 141) | 1.0.0.0 | B | 01-01-01-01-01-ee |
| 10.2.2011 20:00 | 0 (TV 180) | 0.0.0.0 | C | 01-01-01-01-01-ff |
| 10.2.2011 17:00 | 4 (Playback Device 181) | 1.0.0.0 | C | 01-01-01-01-02-aa |
| 10.2.2011 17:00 | 8 (Playback Device 182) | 2.0.0.0 | C | 01-01-01-01-02-bb |
| 10.2.2011 17:00 | 0 (TV 160) | 0.0.0.0 | D | 01-01-01-01-02-cc |
| 10.2.2011 17:00 | 4 (Playback Device 161) | 1.0.0.0 | D | 01-01-01-01-02-dd |
| 10.2.2011 17:00 | 8 (Playback Device 162) | 2.0.0.0 | D | 01-01-01-01-02-ee |

(51) Int. Cl.
*H04L 12/24* (2006.01)
*H04L 12/28* (2006.01)
*H04L 29/12* (2006.01)
*H04N 21/436* (2011.01)
*H04N 21/61* (2011.01)
*H04N 21/6402* (2011.01)

(52) U.S. Cl.
CPC ............ *H04L 41/12* (2013.01); *H04L 61/103* (2013.01); *H04L 61/6022* (2013.01); *H04N 21/43615* (2013.01); *H04N 21/6125* (2013.01); *H04N 21/6402* (2013.01)

(56) References Cited

U.S. PATENT DOCUMENTS

| | | | |
|---|---|---|---|
| 6,523,696 B1* | 2/2003 | Saito | H04N 21/2381 375/E7.019 |
| 7,337,459 B1* | 2/2008 | Tsutsui | H04H 40/90 348/E5.002 |
| 7,590,418 B1 | 9/2009 | Thomson | |
| 7,849,218 B2 | 12/2010 | Funabiki et al. | |
| 2004/0155969 A1* | 8/2004 | Hayashi | H04M 1/72572 348/207.99 |
| 2004/0249975 A1* | 12/2004 | Tuck | H04L 29/12066 709/245 |
| 2005/0027984 A1* | 2/2005 | Saito | G06F 21/10 713/168 |
| 2006/0156327 A1* | 7/2006 | Dolph | H04H 60/32 725/14 |
| 2008/0178212 A1* | 7/2008 | Kinoshita | H04N 21/4882 725/32 |
| 2008/0281995 A1* | 11/2008 | Bae | H04N 21/44231 710/16 |
| 2009/0190040 A1* | 7/2009 | Watanabe | H04N 5/765 348/725 |
| 2010/0162359 A1 | 6/2010 | Casey et al. | |
| 2010/0245606 A1* | 9/2010 | Karaoguz | H04L 12/2803 348/211.99 |
| 2010/0250716 A1 | 9/2010 | Jerye | |
| 2010/0296558 A1 | 11/2010 | Matsushita et al. | |
| 2011/0008019 A1* | 1/2011 | Hirano | H04N 5/782 386/296 |
| 2011/0051002 A1* | 3/2011 | Oh | H04N 5/765 348/569 |
| 2011/0085087 A1* | 4/2011 | Kamida | H04N 5/775 348/705 |
| 2011/0138439 A1* | 6/2011 | Toba | H04N 5/45 725/148 |
| 2011/0181781 A1* | 7/2011 | Oh | H04N 21/42646 348/565 |
| 2011/0202956 A1* | 8/2011 | Connelly | H04N 21/433 725/38 |
| 2011/0265109 A1 | 10/2011 | Goyet et al. | |
| 2012/0036543 A1* | 2/2012 | George | H04N 21/4396 725/106 |
| 2012/0079551 A1* | 3/2012 | Isozaki | H04N 21/4104 725/118 |
| 2012/0099833 A1* | 4/2012 | Oomori | G06F 1/266 386/230 |
| 2012/0185580 A1* | 7/2012 | Detert | H04L 67/125 709/223 |
| 2012/0188454 A1* | 7/2012 | Hasegawa | H04N 5/765 348/563 |
| 2012/0230203 A1 | 9/2012 | Casey et al. | |
| 2013/0014184 A1 | 1/2013 | Mank | |
| 2013/0021536 A1* | 1/2013 | Kamida | H04N 21/43635 348/739 |
| 2013/0038797 A1* | 2/2013 | Chung | H04N 21/43615 348/705 |

FOREIGN PATENT DOCUMENTS

| | | |
|---|---|---|
| CN | 102045528 A | 5/2011 |
| EP | 2 237 531 | 10/2010 |
| WO | 2010 081222 | 7/2010 |

OTHER PUBLICATIONS

International Search Report Issued Nov. 23, 2012 in PCT/EP12/068910 filed Sep. 26, 2012.

* cited by examiner

Device Datatable
2011-02-10:

| Date & time | Logical Address | Physical Address | Network ID | MAC Address |
|---|---|---|---|---|
| 10.2.2011 17:00 | 0 (TV 120) | 0.0.0.0 | A | 01-01-01-01-01-aa |
| 10.2.2011 17:00 | 4 (Playback Device 121) | 1.0.0.0 | A | 01-01-01-01-01-bb |
| 10.2.2011 17:00 | 8 (Playback Device 122) | 2.0.0.0 | A | 01-01-01-01-01-cc |
| 10.2.2011 20:00 | 0 (TV 140) | 0.0.0.0 | B | 01-01-01-01-01-dd |
| 10.2.2011 20:00 | 4 (Playback Device 141) | 1.0.0.0 | B | 01-01-01-01-01-ee |
| 10.2.2011 20:00 | 0 (TV 180) | 0.0.0.0 | C | 01-01-01-01-01-ff |
| 10.2.2011 17:00 | 4 (Playback Device 181) | 1.0.0.0 | C | 01-01-01-01-02-aa |
| 10.2.2011 17:00 | 8 (Playback Device 182) | 2.0.0.0 | C | 01-01-01-01-02-bb |
| 10.2.2011 17:00 | 0 (TV 160) | 0.0.0.0 | D | 01-01-01-01-02-cc |
| 10.2.2011 17:00 | 4 (Playback Device 161) | 1.0.0.0 | D | 01-01-01-01-02-dd |
| 10.2.2011 17:00 | 8 (Playback Device 162) | 2.0.0.0 | D | 01-01-01-01-02-ee |

Fig. 3a 2011-02-11:

| Date & time | Logical Address | Physical Address | Network ID | MAC Address |
|---|---|---|---|---|
| 10.2.2011 17:00 | 0 (TV 120) | 0.0.0.0 | A | 01-01-01-01-01-aa |
| 11.2.2011 17:00 | 4 (Playback Device 121) | 3.0.0.0 | A | 01-01-01-01-01-bb |
| 10.2.2011 17:00 | 8 (Playback Device 122) | 2.0.0.0 | A | 01-01-01-01-01-cc |
| 10.2.2011 20:00 | 0 (TV 140) | 0.0.0.0 | B | 01-01-01-01-01-dd |
| 10.2.2011 20:00 | 4 (Playback Device 141) | 1.0.0.0 | B | 01-01-01-01-01-ee |
| 10.2.2011 20:00 | 0 (TV 180) | 0.0.0.0 | C | 01-01-01-01-01-ff |
| 10.2.2011 17:00 | 4 (Playback Device 181) | 1.0.0.0 | C | 01-01-01-01-02-aa |
| 10.2.2011 17:00 | 8 (Playback Device 182) | 2.0.0.0 | C | 01-01-01-01-02-bb |
| 10.2.2011 17:00 | 0 (TV 160) | 0.0.0.0 | D | 01-01-01-01-02-cc |
| 10.2.2011 17:00 | 4 (Playback Device 161) | 1.0.0.0 | D | 01-01-01-01-02-dd |
| 10.2.2011 17:00 | 8 (Playback Device 162) | 2.0.0.0 | D | 01-01-01-01-02-ee |

Fig. 3b

Operation History Datatable

| Date & Time | Source | Sink | Operation | Time Stamp | UserID |
|---|---|---|---|---|---|
| 10.2.2011 20:30-21:45 | LA:8; PA:1.0.0.0 NwID: A MAC: 01-01-01-01-01-bb (Device 121) | LA:0; PA:0.0.0.0 NwID: A MAC: 01-01-01-01-01-aa (TV 120) | playback | 0:00:00 | User1 |
| 10.2.2011 21:43 | LA:8; PA:1.0.0.0 NwID: A MAC: 01-01-01-01-01-bb (Device 121) | | Stop playback | 0:73:05 | User1 |
| 10.2.2011 21:45 | | LA:0; PA:0.0.0.0 NwID: A MAC: 01-01-01-01-01-aa (TV 120) | standby | | User1 |
| 11.2.2011 20:00 | LA:8; PA:3.0.0.0 NwID: A MAC: 01-01-01-01-01-bb (Device 121) | LA:0; PA:0.0.0.0 NwID: B MAC: 01-01-01-01-01-dd (TV 140) | playback | 0:73:05 | User1 |
| | | | | | |

Fig. 4

ADDRESS MAPPING IN A HDMI NETWORK

CROSS-REFERENCE TO RELATED APPLICATIONS

The present application is based on PCT filing PCT/EP2012/068910 filed 26 Sep. 2012 and claims priority of EP patent application No. 11 183 106.1, filed on 28 Sep. 2011, the entire contents of each of which are incorporated herein by reference.

FIELD OF INVENTION

The present application relates to a network device for a home entertainment network. The invention also relates to a home entertainment network, a data table and a method for controlling and rerouting audio video and data streams in a home entertainment network.

BACKGROUND OF THE INVENTION

Home entertainment devices, like TV sets, set-top boxes, DVD or Blu-ray disk players, MP3 players etc. get more and more popular, particularly if equipped with a so-called HDMI interface. HDMI is the abbreviation of High Definition Multimedia Interface and is a compact audio/video interface for transmitting uncompressed digital data. HDMI allows to connect digital audio/video sources, such as set-top boxes, DVD players, Blu-ray disk players, Personal Computers, videogame consoles and AV receivers to compatible digital audio devices, computer monitors and digital televisions. HDMI supports on a single cable any TV or PC video format, including standard, enhanced and High Definition video, up to eight channels of digital audio and a Consumer Electronics Control (CEC) connection. The CEC allows HDMI devices to control each other when necessary and allows the user to operate multiple devices with one remote control hand set.

From HDMI version 1.4 which was released on May 28, 2009, an HDMI Ethernet channel has been specified which allows for a 100 MB/s Ethernet connection between HDMI connected devices. This Ethernet capability allows to connect HDMI networks which comprises for example a TV set and a video player, with other HDMI networks. In other words, it is possible to build up a multi-room home entertainment network comprising several HDMI networks (sub-networks of the home entertainment network) distributed through the home of a user.

There is an increasing demand for further capabilities of such home entertainment networks, particularly to give a user more options for selecting devices within the network. More particularly, such capabilities should also support mobile devices, like Smartphones, Tablet PCs, and notebooks, etc., even if such devices are plugged in/off frequently.

BRIEF SUMMARY OF INVENTION

It is therefore an object of the present invention to provide a network device for a home entertainment network which has enhanced network-related capabilities even when using mobile devices.

According to an aspect of the present invention there is provided a network device for a home entertainment network comprising a network controller adapted to provide Ethernet communication capability, HEC, and CEC, Consumer Electronics Control, communication capability, and a database generator unit adapted to generate a database containing information about a network device of said home entertainment network and a unique identifier of the respective network device.

That is in other words that the network device is technically equipped with a unit which has the capability to generate a database containing relevant data about the devices within the network. One portion of the information about the network device is a unique identifier allowing to identify a respective network device independently of a logical and/or physical address of the network device within the home entertainment network.

According to the HDMI specification, the physical address of a network device within a home entertainment network may change, for example when the device is disconnected from the network and is reconnected to another HDMI plug. As a consequence, the physical addresses used according to the HDMI specification are not static and thus not reliable over time which limits the range of features which could be offered to a user. The same applies to the logical address of a device within the home entertainment network which may change as well.

By using a unique identifier for each network device within the home entertainment network it is always and at any time possible to identify and hence address a specific network device even if this device was disconnected and reconnected to another HDMI plug. The database containing a unique identifier of a network device hence allows for example to a map the assigned physical address/logical address to the unique identifier of the respective network device. This mapping allows features and applications to re-identify the device once it was disconnected from the network and it comes back to the network. The device can be connected to any free HDMI connector and although the physical address has changed the network device can be identified via the unique identifier as a network device which has been already connected to the network in the past. In other words, by the address mapping which is possible by using a unique identifier for network devices the network device may be identified as well as its previous location and its current new location in the network topology.

In a preferred embodiment, the unique identifier is a so-called MAC address assigned to the network controller. MAC address is an abbreviation of Media Access Control Address which is an unique identifier assigned to a network interface for communications on the physical network segment. MAC addresses are used for numerous network technologies and most IEEE 802 network technologies including Ethernet.

According to a further aspect of the present invention there is provided a home entertainment network comprising at least two network devices according to the present invention.

According to a further aspect of the present invention, a data table stored in a memory of a network device according to the present invention is provided. The data table comprises first information indicating an operation of a particular network device, second information indicating the network address of said particular network device, third information indicating the time and date of the operation and fourth information indicating a unique identifier of said network device. It is to be noted here that the data table is not limited to the information mentioned in this application. The data table may contain further information like IP addresses or other network device related data.

In this data table it is possible to register an operation carried out by a user of a network device, like play video, stop video, etc. The stored data in the data table gives a detailed picture of operations selected by a user in the past. By using a unique identifier, preferably the MAC address of a network device, a network device could always be identified even if the logical/physical addresses have been changed.

According to a further aspect of the present invention there is provided a method for controlling and rerouting audio, video and data streams in a home entertainment network comprising the step of generating a database containing information about a network device of said home entertainment network and a unique identifier of the respective network device.

The information about a network device may for example be a network address, particularly a logical address and a physical address, and/or information about an operation of said network device caused by a user and/or information about preferences assigned to said network device.

In case that the home entertainment network comprises two or more sub-networks, said information may also comprise a sub-network identifier.

According to still further aspects a computer program, preferably in form of network device firmware, comprising program means for causing a controller, preferably a network device controller, to carry out the steps of the method according to the present invention, when said computer program is carried out on a controller, as well as a computer readable non-transitory medium having instructions stored thereon which, when carried out on a controller, cause the controller to perform the steps of the method according to the present invention are provided.

Preferred embodiments of the invention are defined in the dependent claims. It shall be understood that the claimed method has similar and/or identical preferred embodiments as the claimed network device and as defined in the dependent claims.

The present invention is based on the idea to generate a database, preferably in form of at least one data table, which comprises information about a network device of said home entertainment network, preferably a HDMI network, and a unique identifier of the respective network device. The unique identifier stored in the database allows to identify unambiguously a network device regardless of its location within the home entertainment network. Even if the network device changes its location with the result that the physical address also changes from a first value to a second value, the network device can be identified via the unique identifier as the device which had the physical address with the first value before. Again, also the Logical Address may change.

BRIEF DESCRIPTION OF DRAWINGS

These and other aspects of the present invention will be apparent from and explained in more detail below with reference to the embodiments described hereinafter. In the following drawings:

FIG. 3a and b show examples of a database reflecting the first scenario and the second scenario, respectively;

FIG. 4 shows an example of an operation history database; and

DETAILED DESCRIPTION OF THE INVENTION

Figure 1:
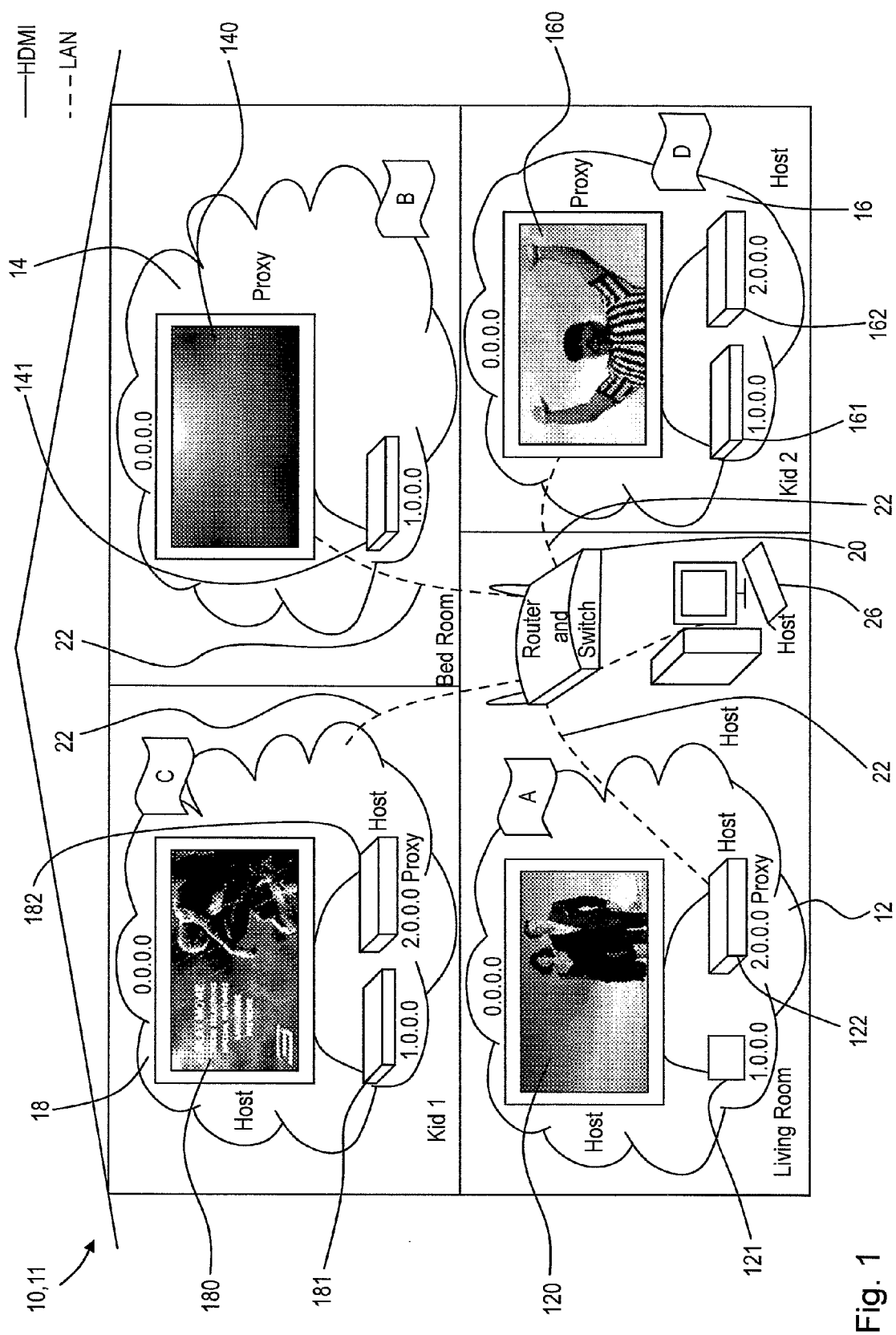
FIG. 1 shows an example of a home entertainment network according to a first scenario.

In FIG. 1, an illustrative example of a home entertainment network is shown and designated with reference numeral 10. This illustrative example serves to describe the network devices and their functionality. However, it is to be noted that the present invention is not limited to such a home entertainment network.

In the context of the present invention, home entertainment network means any data network designed to couple network devices which in turn are designed to store, manage and access all forms of digital media in the home. One example of such a home entertainment network is a HDMI network (which in turn could comprise HDMI sub-networks), the network devices of which having HDMI interfaces for providing the network capability. HDMI is a standard for transmitting uncompressed digital data and is the abbreviation of High Definition Multimedia Interface. In the following, it is assumed that the home entertainment network 10, shown in FIG. 1 is a HDMI network 11 comprising several HDMI sub-networks. However, the present invention is not limited to HDMI networks.

The HDMI network 11, shown in FIG. 1, extends over several rooms, in the present embodiment four rooms, within a home. The HDMI network 11 comprises four sub-networks 12, 14, 16, 18, one for each room.

Each sub-network 12, 14, 16, 18 comprises at least one network device, preferably at least two network devices, one of which acting as a sink device and the other as a source device. A sink device receives audio/video streams and displays or plays back the video and audio streams, respectively. The source device in turn generates the audio/video streams from a Blu-ray disk, for example, and transmits this stream to the sink device.

According to the HDMI specification (version 1.4) a HDMI sub-network comprises typically one sink device only and a plurality of source devices. Although this restricted sub-network structure is used in the present embodiment, the present invention is not limited thereto, that is the sub-network may also comprise several sink devices and source devices. Incase that there is more than one sink device present in the network, the other sink devices have only limited network functionality.

In the example shown in FIG. 1 the four sub-networks 12-18 each comprise a sink device in form of a TV set 120, 140, 160, 180 and at least one source device in form of a Blu-ray disk player 122, 162, 182 and/or a set-top box 141. The sub-networks 120, 160 and 180 comprise further source devices, for example a mobile device 121, preferably a notebook, and set-top boxes 161 and 181.

All the sink and source devices which are also referred to as network devices are equipped with HDMI interfaces for coupling the source devices with the sink device in a sub-network.

The HDMI network 11 also comprises a network switch 20 which is preferably equipped with a router functionality. The switch 20 allows the communication of the sub-networks beyond their boundaries so that a communication path between different sub-networks may be established.

As it is shown in FIG. 1, data lines 22 are provided between the switch 20 and one network device within a sub-network 12-18. For example, the Blu-ray disk device 122 in the sub-network 12 is connected with the switch 20 via the data line 22. The network devices which are coupled to the switch 20 are referenced as proxy in FIG. 1.

The data lines 22 are preferably Ethernet data lines carrying data according to the TCP/IP protocol. However, it is of course possible to use other communications protocols allowing the streaming of audio/video content.

Further, it may also be contemplated to realize the data communications between a sub-network and the switch wirelessly, for example by using the known Wireless Local Area Network (WLAN) standards.

Just for completeness, the network 10 may also comprise a Personal Computer 26 which is coupled with the switch 20 via an Ethernet line.

It is apparent that a communication between sub-networks via the switch 20 requires unique addresses assigned to the respective network devices. Although the HDMI specification defines an address scheme, this scheme does not allow such a communication due to the ambiguities of the addresses. It is for example known from the HDMI specification that the sink device of a HDMI sub-network 12, 14, 16, 18 is usually assigned the address 0.0.0.0, as it is shown in FIG. 1. The source devices which are coupled with the sink devices are assigned the addresses 1.0.0.0 or 2.0.0.0, etc. as it is the case in the sub-networks 12, 16 and 18.

It is readily apparent that the sink devices 120, 140, 160, 180 of the home entertainment network 10 has the same HDMI address which makes a communication between these devices impossible.

To solve this address problem, an extended address scheme is used. The basis of this extended address scheme is a sub-network identifier which is unique for each sub-network. For example, sub-network 12 is assigned the identifier "A", the sub-network 14 is assigned the identifier "B", and so on. Hence a combination of the HDMI address, like 0.0.0.0, and the sub-network identifier, like "A", unambiguously identifies one network device within the home entertainment network 10. This extended network scheme is the subject of a patent application EP 091 56 939, filed on Mar. 31, 2009, the content of which is incorporated by reference herewith.

Hence, the network structure shown in FIG. 1 allows for example the data transmission (e.g. video streaming) between a source device 122 of one sub-network 12 and a sink device 140 of another sub-network 14 using Ethernet.

As to make this capability of the home entertainment network 10 readily achievable for a user, the network devices use a database, preferably comprising a device data table and an operation history data table.

The first data table, namely the device data table contains information about all network devices which have been recognized in the home entertainment network 10 in the past. An example of such a device data table is shown in FIG. 3a. The device data table in the present example comprises eleven data records, one for each network device in the home entertainment network 10. Each data record comprises the date and time, the network device has logged in, a logical address, a physical address, the network identifier and the MAC address of the network device. The logical address and the physical address are part of the HDMI specification. For example, the TV set 120 of the sub-network 12 is described by the first data record of the device data table. The TV set 120 has been logged in or switched on the first time on Feb. 10, 2011 at 5 o'clock PM. The physical address of the TV set 120 is 0.0.0.0, the logical address is 0 and the TV set 120 is member of the sub network, which assigned the network identifier "A". Further, the MAC address of the TV set 120 is 01-01-01-01-01-AA in the present embodiment. As it is known in the art, the MAC address is a unique identifier for a network device or at least the network interface of the network device, which is assigned by the manufacturer of the network device and which is consent over the lifetime of the network device.

Although the present invention uses the MAC address as a unique network device identifier, other identifiers could also be used provided that such identifiers are neither changeable nor changed during a certain period of time.

On the basis of this device database, it is possible to find a particular network device within the home entertainment network and to send data to this device. Even if a network device changes its location and hence its physical address, this particular network device can be found and identified via the MAC address which is still the same.

Figure 2:
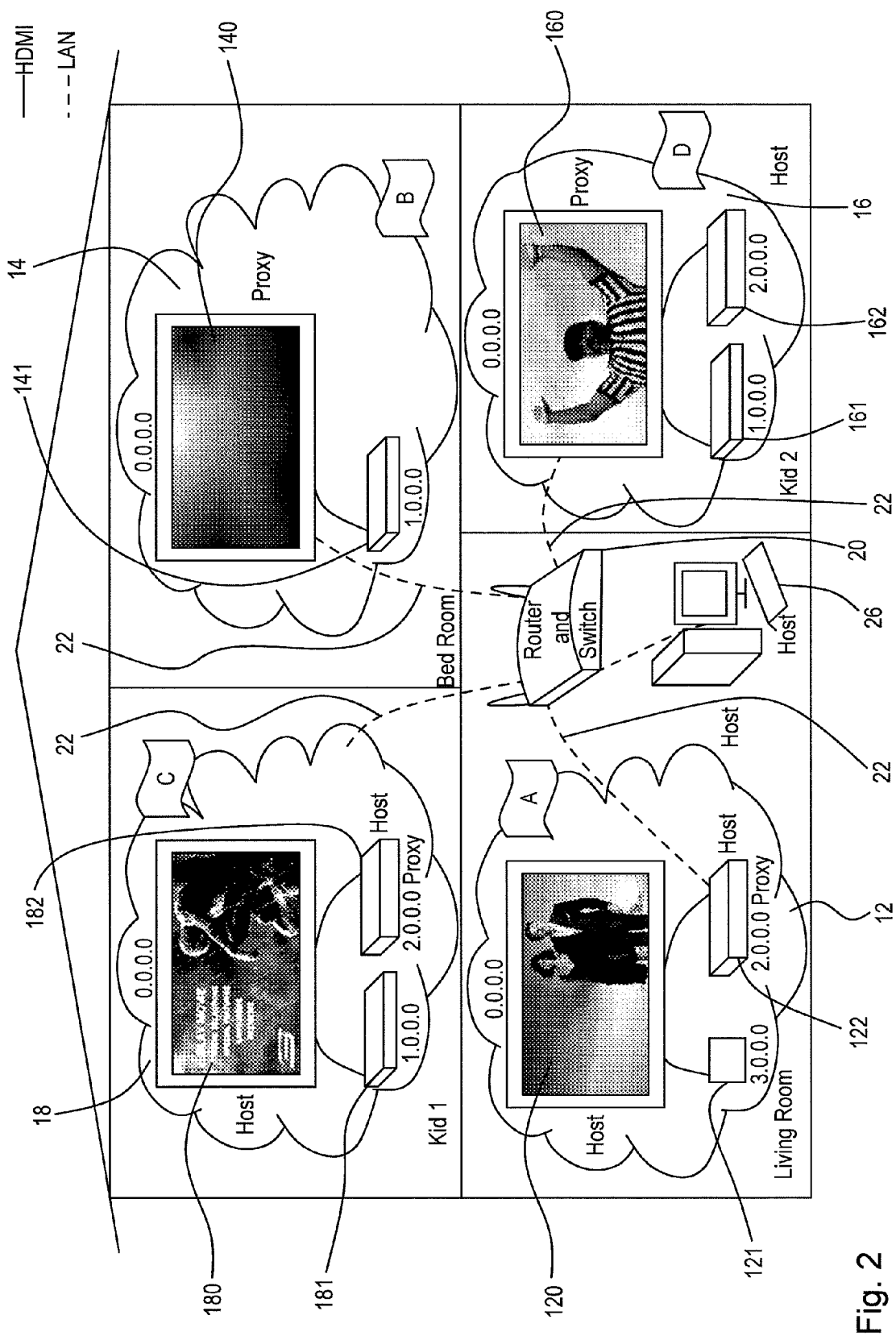
FIG. 2 shows an example of the home entertainment network according to a second scenario.

An example for illustrating such a scenario is shown in FIG. 2. Here, the mobile network device 121, preferably a notebook, has been disconnected from the sub-network 12 shown in FIG. 1, and has been reconnected later to the TV set 120 of the sub-network 12. However, the user plugged in the HDMI cable into a different HDMI connector of the TV set 120 with the result that the network device 121 has been assigned a different physical address, here 3.0.0.0. This change of the physical address is reflected by the second record in the data table of FIG. 3b. It is apparent from this data table that although the physical address has changed, the MAC address is still the same and could be used for unambiguously identifying the network device 121. This is also true even if the network device 121 is coupled with a TV set of a different sub-network, for example.

There are many possibilities to build up such a device data table. A preferred way is to send data packages to each possible address within the home entertainment network 10. If a network device receives a respective data package, it returns an acknowledge message back to the sender. This acknowledge message is received and causes the generation of a data record as mentioned above. Generally, the network devices are able to return an acknowledge message even if they are in a stand-by mode. Only if the respective network device is switched off, it is not recognized and hence will not result in generation of a data record.

The device data table is preferably stored in every network device, but it is also possible to store this data table only in the proxy of each sub-network. Further, to enhance the generation of the device data table, it is also possible to synchronize the device data tables of different network devices of the same or different sub-networks. Synchronizing means in the context of the present application that the data records of other device data tables are collected and added to the own device data table if this information is not already present.

It is also to be noted that data records corresponding to particular network devices are not deleted if the respective network device is for example switched off.

The second data table, namely the operation history data table, contains data records describing the operations carried out in the whole home entertainment network 10 in the past. In other words, the operation history data table is a picture of the operations tasked by any user. The operation history data table may be compared with a logbook in which events are recorded.

An example of an operation history data table is shown in FIG. 4. It is apparent therefrom that a data record of the operation history data table comprises date and time, the address of the source device, the address of the sink device, the kind of operation tasked by the user, the mode of the data transmission, a time stamp containing information at which point e.g. a playback was paused or stopped and a user ID defining which user tasked the respective operation. For example, the first data record in the operation history data table of FIG. 4 contains the information that there was a playback operation between the source device with the address 1.0.0.0 of sub-network A (mobile network device 121) to the sink device with the address 0.0.0.0 of the same sub-network A (TV set 120). The respective operation has been taken place on Feb. 10, 2011 from 8:30 PM to 9:45 PM. The time stamp is set to 0:00:00 and the user having tasked this operation is User 1.

As it is apparent from the history data table, the MAC addresses of the source device as well as the sink device are also stored.

The operation history data table is preferably stored in each network device of the home entertainment network 10, or as an alternative in at least the proxy of each sub-network.

The operation history data table is automatically generated and a data record is added each time the user carried out an operation, like playback, stop playback, switch on, switch into stand-by mode, etc. Hence, the operation history data table grows with time, as it is shown in FIG. 4. For example the second added data record in the operation history data table of FIG. 4 contains the information that the source device 121 of sub-network 12 has been operated by the user, namely User 1, to stop playback at 9:43 PM and at time position 0:73:05 of the playback medium. The next added data record contains the information that the sink device, namely the TV set 120 of the sub-network 12 has been switched off into the stand-by mode by the user, namely User 1.

The next day, here Feb. 11, 2011 at 8:00 PM, the user, namely User 1, has started playback from the source device 121 to the sink device 140 of the sub-network 14 (network identifier B) at time position 0:73:05 of the playback medium. For streaming the respective data from the source device to the sink device, the Ethernet communication capability is used. The respective data record is shown in the data table of FIG. 4 in the last line.

It is to be mentioned that the source device 121 streaming to the sink device 140 has a different physical address, here 3.0.0.0 compared to the former physical address 1.0.0.0 (second record of the operation history data table), however, the MAC address is still the same and is used for identification purposes.

In order to limit the growth of the operation history data table, it is possible to delete or overwrite data records according to selectable rules, e.g. data records older than a selectable time period are deleted.

Each network device of the home entertainment network 10 is adapted to detect any operation tasked by a user and to generate a respective data record to be added to the operation history data table. In the event that the network device may only detect its own operations, the operation history data tables are synchronized between the network devices of the home entertainment network. As a result, the operation history data tables all comprise the same information and also information corresponding to operations of other network devices within the home entertainment network 10.

The synchronization of the data tables within the home entertainment network 10 may be carried out by using the Ethernet capability, the HEC capability or any other communications standard, like the consumer electronic control of the HDMI specification. Ethernet is e.g. used between proxies of different sub-networks, and HEC is for example used between devices within a sub-network. A combination of both is also possible.

As already mentioned before, the data tables are synchronized. The synchronization might be triggered for example every time an operation is executed, every time a network device is powered up, or for example manually by the user via a graphical user interface or for example a remote control command or any other selectable rule.

With respect to the data table synchronization, it would also be possible to hold a "master" data table (i.e. a "master" device data table and/or a "master" operation history data table) centrally, e.g. in the router device, thus having the advantage that all devices may read out the database once they are powered on and from that time either in a regular time slice or when they are involved in a user operation. If a central "master" data table is present, each user operation has to be registered in this "master" data table.

The generation and maintenance of the described data tables serve at least one major purpose, namely to give the user more options to control the operation of the network devices of the home entertainment network. Some examples are presented below. However, it is to be noted that the list of examples is not exhaustive and of course further examples are conceivable on the basis of the database, particularly the device data table and/or the operation history data table.

In general, with the device data table, all network devices have the overview about the devices in the network: Source devices, sink devices and for example repeater devices, also mobile devices that are not permanent present may be contained in the device data table. Based on this device data table, it is possible to provide the user with device selection possibilities that are available in the home entertainment network.

For example, if the user switches on the TV set 120, a manual is presented which lists all source devices for selection registered in the device data table. This gives the user the possibility to select for example the Blu-ray disk player 182 of the sub-network 18.

With the operation history data table all network devices have the knowledge about the operations in the network, for example the device status, streaming directions, active source, sink and repeater devices. Also playback and power operations are shared. The operation history data table offers at any time and on any network device the current status of operations. It offers also the possibility to transfer operations among network devices, for example a video streaming from a source device to a sink device could be transferred to another sink device seamlessly, even if the location of the source device for example has changed. A more detailed explanation of such a possibility will follow below.

Generally the options of such operations can be controlled and presented in various ways to the user, for example by displaying the options via a graphical user interface, by selection of options with dedicated commands, by face recognition technologies or by special remote commander devices with identification tags IDs.

An illustrative scenario in which the database is used for offering control operations, is for example as follows:

A user starts to playback a video from the mobile network device 121, here a notebook, of the sub-network 12 via for example a "one touch play" feature. The notebook 121 as a source device is then streaming the video content to the coupled TV set 120, which acts as the sink device of the sub-network 12. The source device 121 registers the respective control command from the user and generates a data record for the operation history data table. This record is for example shown in the first line of the operation history data table of FIG. 4.

After a while, the user stops the playback and hence the streaming to the sink device 120 and powers off the sink device, for example via a "system stand-by" feature. Again, a particular data record is generated and added to the operation history data table as shown in FIG. 4. Here, two data records have been added, one relating to the source device 121 and one to the sink device 120.

The next day, the user disconnects the notebook 121 from the home entertainment network 10 for any reasons. At the evening, the user reconnects the notebook 121 again with the TV set 120, however, using a different HDMI connector. The result is that the network device 121 is assigned a different physical address, here 3.0.0.0, as for example shown in the data table of FIG. 3b. However, the MAC address is still the same and could be used to identify this device as the device which acted as source device the day before for User 1.

Then, the user goes to the bedroom and powers on the TV set 140 of the sub-network 14. If the synchronization of the operation history data table between the proxy (Blu-ray disk device 122) of the sub-network 12 and the respective proxy, here the TV set 140, was already done, the Graphical User Interface (GUI) of the TV set 140 of the sub-network 14 will offer the option to continue the playback that was stopped at time position 0:73:05 in the living room. The respective information for presenting this option is gained from the operation history data table and the device data table. The second data record of the data table shown in FIG. 4 gives the information that the notebook 121 of the sub-network 12 has been stopped. Via the MAC address stored in the second data record of the history data table and the respective entry of this network device in the device data table, the TV set 140 finds out that the notebook 121 has now the physical address 3.0.0.0. This kind of mapping is possible by using a unique identifier for each network device in the data tables, particularly a MAC address.

In the next step, the user selects the offered continuation of the playback at time position 0:73:05 from the notebook 121 in the living room. The TV set 140 in the bedroom knows from the operation history data table and the device data table, as mentioned before, the network ID, the logical and the new physical address of the notebook 121 in the living room and the time stamp. The TV set 140 in the bedroom now activates an Ethernet channel to the living room notebook device 121.

Once the Ethernet channel from the TV set 140 to the notebook 121 in the living room is activated, the streaming of audio and video can be started from an application, for example DLNA (Digital Living Network Aligns). Any other conceivable application can start the streaming from the notebook device 121 in the living room to the TV set 140 in the bedroom via an Ethernet channel.

As a result of this rerouting of the audio and video stream, a respective data record is generated by the two involved network devices 121, 140 and is added to the operation history data table, as shown in FIG. 4.

It is to be noted that this is just an illustrative example how to use the mentioned data tables. This example could for example be improved by using any user recognition process for identifying the user who has operated the network devices. If for example the TV set 140 in the bedroom recognizes that the same user has switched on the TV set 140 who has stopped the playback in the living room before, the TV set 140 could use this information for automatically rerouting the audio and video stream from the living room to the bedroom without waiting for a user selection.

Several user recognition processes are conceivable, for example a face recognition or special remote commander devices with identification tags.

With respect to FIGS. 1 and 2, a particular streaming scenario has been described. However, other scenarios are of course also possible using more than two network devices for streaming. Assuming a streaming from said top box 141 of sub-network 14 to TV set 120 of sub-network 12, set-top box 141 streams to proxy 140 (TV set 140) via HEC, proxy 140 streams to proxy 122 via Ethernet and proxy 122 streams to TV set 120 via HEC.

The example described above refers to the playback of the content stored on the laptop 121. However also if the user is watching a TV program via a set-top box or an internal tuner of a TV set, this operation is also registered in the operation history data table. In this case in the column "Operation" the TV program information is stored, for example by program number (e.g. 15) and program ID (e.g. BBC1) or frequency or channel number.

Figure 5:
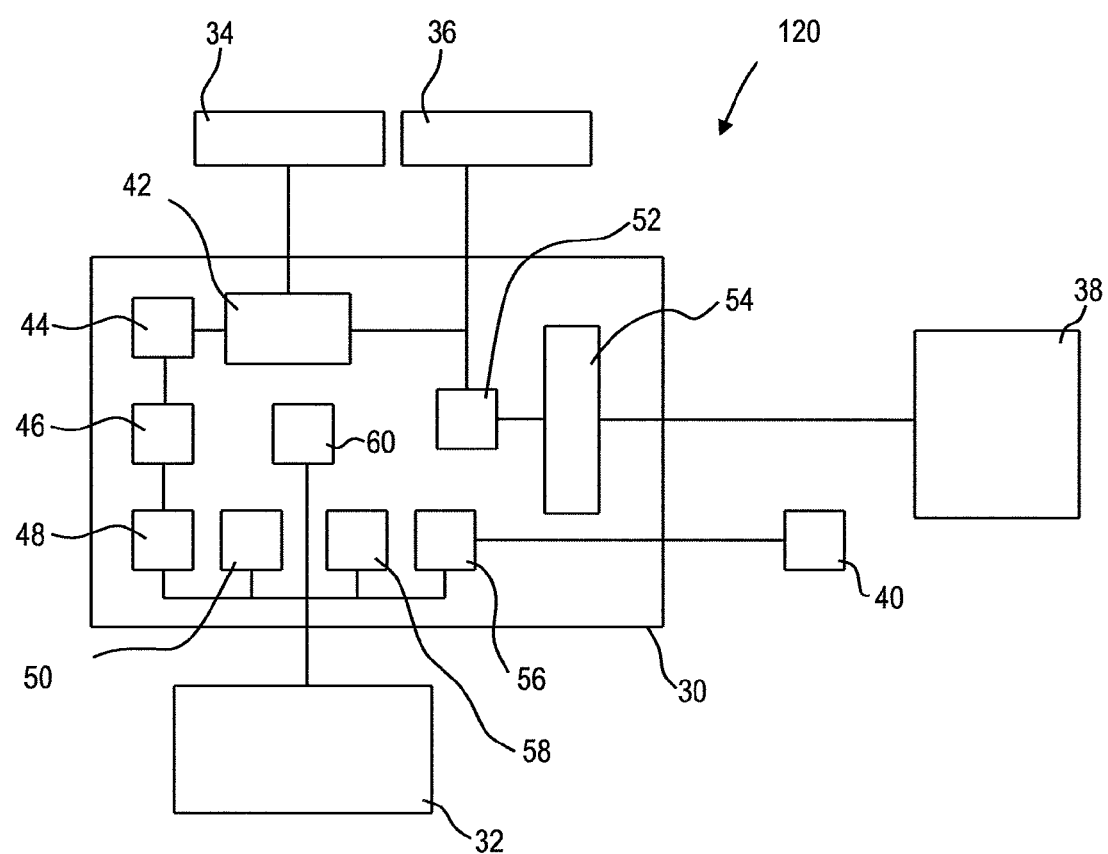
FIG. 5 shows a block diagram of a network device.

With respect to FIG. 5, a portion of a network device, here the TV set 120 of the sub-network 12, is shown in form of a block diagram. The TV set 120 comprises a controller which is indicated with reference numeral 30. A memory or storage element is coupled with the controller and is indicated with reference numeral 32. As to establish communications with other network devices, a HDMI interface 34 is provided and also coupled with the controller 30.

In order to receive commands from a remote commander, a remote control receiver 36 is provided.

Finally, the TV set 120 comprises for example an LCD display 38 and a camera unit 40 which is for example used for face recognition.

The controller 30 comprises a HDMI network controller 42 which is coupled with the HDMI interface 34 and which implements all the functions specified in the HDMI specification (for example version 1.4).

The controller 30 further comprises a detecting unit 44 which detects all the user commands input via the remote commander or directly via any hardware buttons. The command event detected by the detecting unit 44 is supplied to a generating unit 46 which is adapted to generate a data record for the operation history data table mentioned above. This data record generated by the generating unit is supplied to the storing unit 48 which serves to store this data record in the respective operation history data table stored in the memory 32.

The information stored in the operation history data table as well as in the device data table is evaluated by an evaluation unit 50 which supplies the result to an operation option unit 52. This unit 52 is adapted to provide the user with the selectable command options presented on the LCD display 38 by means of the graphical interface 54.

The device data table is built up and maintained by a database generating unit 58 and is synchronized with other device data tables via a synchronization unit 60. As well, this synchronization unit 60 synchronizes the operation history data table with other network devices.

It is to be noted that this is an exemplified structure of a part of a network device, only. The units may be provided in hardware and/or software.

The invention has been illustrated and described in detail in the drawings and foregoing description, but such illustration and description are to be considered illustrative or exemplary and not restrictive. The invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

A computer program may be built in the firmware of a network device, or it may be stored/distributed on a suitable non-transitory medium, such as an optical storage medium or a solid-state medium supplied together with or as part of other hardware, but may also be distributed in other forms, such as via the Internet or other wired or wireless telecommunication systems.

Any reference signs in the claims should not be construed as limiting the scope.

The invention claimed is:

1. A network device for a network comprising circuitry configured to
provide communication capability,
generate a database containing information about a network device of said network, the information comprising a date and time at which the network device has logged into the network, a logical address, a physical address, and a unique identifier of the respective network device, the unique identifier being independent of both the logical address and the physical address such that the unique identifier does not change when either the logical address or the physical address changes,
wherein the database includes an operation history data table having first information indicating a source/sink operation in which a particular network device operates as a source and another particular network device operates as a sink for the source, second information indicating the logical address and the physical address of each of the source and the sink, third information indicating a time and date of the source/sink operation and fourth information indicating the unique identifier of each of the source and the sink, and
add a data record to the operation history data table each time the source/sink operation has been carried out.

2. The network device of claim 1, wherein said unique identifier is a Media Access Control (MAC) address assigned to the network device.

3. The network device of claim 1, wherein said information further comprises information about an operation of said network device tasked by a user.

4. The network device of claim 1, wherein said information further comprises information about preferences assigned to said network device.

5. The network device of claim 3, wherein the circuitry is configured to
detect each device operation tasked by a user of the network device;
generate a data record on the basis of the detected device operation, and
store the data record in the database.

6. The network device of claim 5, wherein the data record comprises the logical address and the physical address of the network device, an indication of the operation detected and a date/time the operation was detected.

7. The network device of claim 6, wherein the data record comprises the logical address and the physical address of each of the network devices within the network being involved in the operation.

8. The network device of claim 6, wherein the data record further comprises a sub-network identifier identifying the sub-network, which the network device is part of, within the network.

9. The network device of claim 1, wherein the circuitry is configured to
evaluate the database, and
provide operation options in response to the evaluation of the database.

10. The network device of claim 3, wherein the data record further comprises information about the user tasking the operation.

11. The network device of claim 10, wherein the circuitry is configured to identify the user.

12. The network device of claim 11, wherein said circuitry comprises a camera and is configured to perform face recognition according to an output of the camera.

13. The network device of claim 1, wherein the circuitry is configured to synchronize the database with respective other databases of other network devices within the network.

14. The network device of claim 13, wherein the circuitry is configured to use the communication capability for synchronizing.

15. The network device of claim 1, wherein the network device is one of a TV set, a Blu-ray player, a DVD device, an AV receiver, a video recorder device, an MP3 player, a personal computer, a mobile device (PDA), a smart phone, a tablet or any other device connected to the network.

16. A network comprising at least two network devices as defined in claim 1.

17. The network device of claim 1, wherein said unique identifier is a Media Access Control (MAC) address.

18. A method for controlling and re-routing audio, video and data streams in a network, comprising:
generating a database containing information about a network device of said network, the information comprising a date and time at which the network device has logged into the network, a logical address, a physical address, and a unique identifier of the respective network device, the unique identifier being independent of both the logical address and the physical address such that the unique identifier does not change when either the logical address or the physical address changes,
wherein the database includes an operation history data data table having first information indicating a source/sink operation in which a particular network device operates as a source and another particular network device operates as a sink for the source, second information indicating the logical address and the physical address of each of the source and the sink, third information indicating a time and date of the source/sink operation and fourth information indicating the unique identifier of each of the source and the sink, and
adding a data record to the operation history data table each time the source/sink operation has been carried out.

19. The method of claim 18, wherein said unique identifier is a Media Access Control (MAC) address of the respective network device.

20. The method of claim 18, wherein said information further comprises information about an operation of said network device tasked by a user.

21. The method of claim 18, wherein said information further comprises information about preferences assigned to said network device.

22. The method of claim 20, further comprising:
 detecting an operation of a network device tasked by the user,
 generating a data record on the basis of the detected network device operation, and
 storing said data record in said database.

23. The method of claim 22, wherein the data record is filled with the logical address and the physical address of the network device, a Media Access Control (MAC) address of said network device, an indication of the operation detected and a date and time the operation was detected.

24. The method of claim 23, wherein the data record is filled with the logical address and the physical address of each network device being involved in the operation within the network.

25. The method of claim 18, further comprising:
 evaluating the database, and
 providing operation options in response to the evaluating step.

26. The method of claim 18, further comprising synchronizing the data-base of a network device with respective databases of other network devices within the network.

27. The method of claim 18, further comprising re-routing an audio, video and/or data stream from one network device to another network device on the basis of the data stored in the database.

28. The method of claim 18, further comprising presenting a user a list of network devices for selection as a source or sink network device for streaming, the list being generated on the basis of the database.

29. The method of claim 18, further comprising identifying a user tasking an operation.

30. The method of claim 29, further comprising adding further information to the database, the information containing information identifying the user.

31. The method of claim 29, further comprising providing operation options based on the user identification.

* * * * *